United States Patent
Oderov et al.

(12) 
(10) Patent No.: US 11,894,988 B1
(45) Date of Patent: Feb. 6, 2024

(54) SYSTEM AND METHOD FOR LOGICAL NETWORK MANAGEMENT IN VIRTUAL STORAGE APPLIANCES WITHIN A CLOUD COMPUTING ENVIRONMENT

(71) Applicant: Dell Products, L.P., Round Rock, TX (US)

(72) Inventors: Roman Oderov, St. Petersburg (RU); Dmitry Krivenok, The Gallops (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/075,494

(22) Filed: Dec. 6, 2022

(51) Int. Cl.
*H04L 41/40* (2022.01)
*H04L 61/50* (2022.01)

(52) U.S. Cl.
CPC .............. *H04L 41/40* (2022.05); *H04L 61/50* (2022.05)

(58) Field of Classification Search
CPC ................................ H04L 41/40; H04L 61/50
USPC ......................................................... 709/245
See application file for complete search history.

(56) References Cited

U.S. PATENT DOCUMENTS

| | | | | |
|---|---|---|---|---|
| 9,841,988 B1* | 12/2017 | Magnezi | ................. | H04L 67/34 |
| 2012/0099602 A1* | 4/2012 | Nagapudi | ........... | H04L 12/4633 370/401 |
| 2012/0176912 A1* | 7/2012 | Kwag | ................... | H04W 28/06 370/242 |
| 2022/0200926 A1* | 6/2022 | Schultze | ............... | G06F 9/5077 |
| 2023/0297404 A1* | 9/2023 | Shen | .................. | G06F 9/45558 718/1 |

FOREIGN PATENT DOCUMENTS

CN 113660316 A * 11/2021
WO WO-2017000616 A1 * 1/2017

\* cited by examiner

*Primary Examiner* — James E Springer
(74) *Attorney, Agent, or Firm* — Brian J. Colandreo; Heath M. Sargeant; Holland & Knight LLP

(57) ABSTRACT

A method, computer program product, and computing system for generating a logical network for a virtual storage appliance deployed in a cloud computing environment. The logical network may be associated with a cloud subnet network interface within the cloud computing environment. One or more logical network addresses may be allocated from the cloud subnet network interface within the cloud computing environment to the virtual storage appliance.

20 Claims, 9 Drawing Sheets

SYSTEM AND METHOD FOR LOGICAL NETWORK MANAGEMENT IN VIRTUAL STORAGE APPLIANCES WITHIN A CLOUD COMPUTING ENVIRONMENT

BACKGROUND

Storing and safeguarding electronic content may be beneficial in modern business and elsewhere. Accordingly, various methodologies may be employed to protect and distribute such electronic content.

Storage of electronic content may be deployed in a cloud computing environment. A cloud computing environment is a technological environment that provides cloud-based computing services over a set of hosted servers and applications which are accessible over the internet or other network configuration. Examples of cloud-based computing services include applications and development platforms, to servers, storage, and virtual computing systems. Cloud-based computing services are provided by cloud computing providers (cloud providers) as a service over the internet. Their services include servers, virtual machines, applications, application development platforms, storage, databases, and/or networking.

With enterprise storage systems, one of the ways to organize external and internal networking in an on-premises storage system is to have a set of logical networks (e.g., a management network, one or more storage networks, and/or one or more networks for internal use within the storage system). Network settings are usually managed manually by an administrator, who explicitly specifies necessary network addresses (e.g., IP addresses), their purposes (what they are used for in the system), VLANs, gateways, maximum transmission units (MTUs), etc. However, cloud networking (e.g., networking of VSAs within a cloud computing environment) has significant distinctions from the configuration of an on-premises storage system. For example, cloud networking does not include Layer 2 networking. Additionally, cloud networking has a single subnet per network interface/port. In some implementations, there are limits on the number of network interfaces per VSA instance deployed and there are typically limited numbers of network addresses per network interface. Additionally, moving a network address from one network interface to another may require orchestration within the cloud computing environment. Further, cloud computing environments may include automatic dynamic network address management (IP Address Management (IPAM)). Accordingly, it will be appreciated that various distinctions exist between on-premises logical network deployment versus cloud computing environment logical network deployment, which reduce the effectiveness of VSA deployment in a cloud computing environment.

SUMMARY OF DISCLOSURE

In one example implementation, a computer-implemented method executed on a computing device may include, but is not limited to, generating a logical network for a virtual storage appliance deployed in a cloud computing environment. The logical network may be associated with a cloud subnet network interface within the cloud computing environment. One or more logical network addresses may be allocated from the cloud subnet network interface within the cloud computing environment to the virtual storage appliance.

One or more of the following example features may be included. The logical network may include a network gateway, a maximum transmission unit (MTU), and a network type. The network gateway is automatically obtained from the cloud computing environment. The MTU and the network type may be user-defined. Generating the logical network for the virtual storage appliance may include generating the logical network without any network addresses. The one or more logical network addresses may include one or more floating network addresses. The one or more floating network addresses may be automatically defined by dynamic network address management in the cloud computing environment.

In another example implementation, a computer program product resides on a computer readable medium that has a plurality of instructions stored on it. When executed by a processor, the instructions cause the processor to perform operations that may include, but are not limited to, generating a logical network for a virtual storage appliance deployed in a cloud computing environment. The logical network may be associated with a cloud subnet network interface within the cloud computing environment. One or more logical network addresses may be allocated from the cloud subnet network interface within the cloud computing environment to the virtual storage appliance.

One or more of the following example features may be included. The logical network may include a network gateway, a maximum transmission unit (MTU), and a network type. The network gateway is automatically obtained from the cloud computing environment. The MTU and the network type may be user-defined. Generating the logical network for the virtual storage appliance may include generating the logical network without any network addresses. The one or more logical network addresses may include one or more floating network addresses. The one or more floating network addresses may be automatically defined by dynamic network address management in the cloud computing environment.

In another example implementation, a computing system includes at least one processor and at least one memory architecture coupled with the at least one processor, wherein the at least one processor configured to generate a logical network for a virtual storage appliance deployed in a cloud computing environment. The logical network may be associated with a cloud subnet network interface within the cloud computing environment. One or more logical network addresses may be allocated from the cloud subnet network interface within the cloud computing environment to the virtual storage appliance.

One or more of the following example features may be included. The logical network may include a network gateway, a maximum transmission unit (MTU), and a network type. The network gateway is automatically obtained from the cloud computing environment. The MTU and the network type may be user-defined. Generating the logical network for the virtual storage appliance may include generating the logical network without any network addresses. The one or more logical network addresses may include one or more floating network addresses. The one or more floating network addresses may be automatically defined by dynamic network address management in the cloud computing environment.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
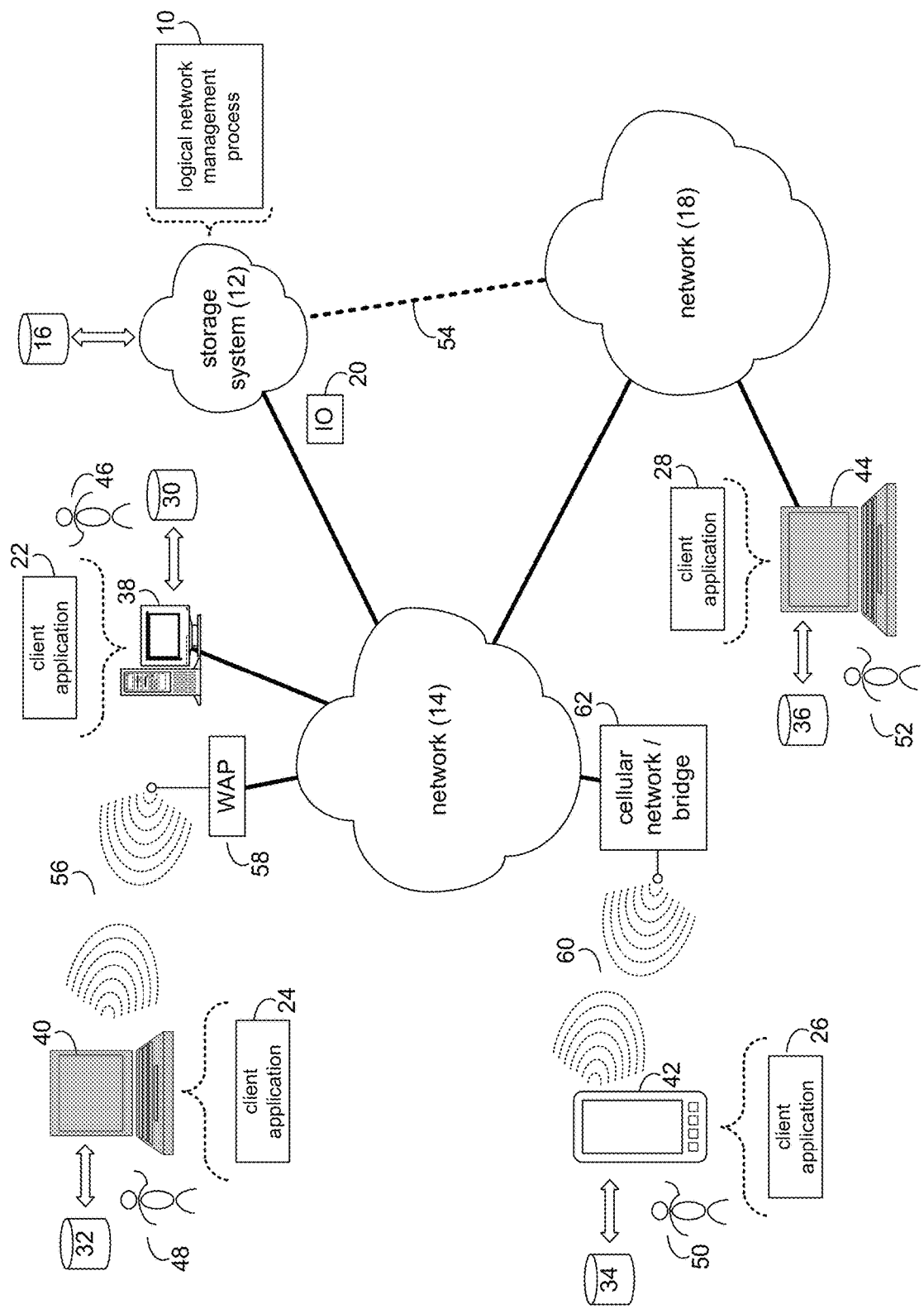
FIG. 1 is an example diagrammatic view of a storage system and a logical network management process coupled to a distributed computing network according to one or more example implementations of the disclosure.

Referring to FIG. 1, there is shown logical network management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of logical network management process which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of logical network management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a logical network management process, such as logical network management process 10 of FIG. 1, may include but is not limited to, generating a logical network for a virtual storage appliance deployed in a cloud computing environment. The logical network may be associated with a cloud subnet network interface within the cloud computing environment. One or more logical network addresses may be allocated from the cloud subnet network interface within the cloud computing environment to the virtual storage appliance.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
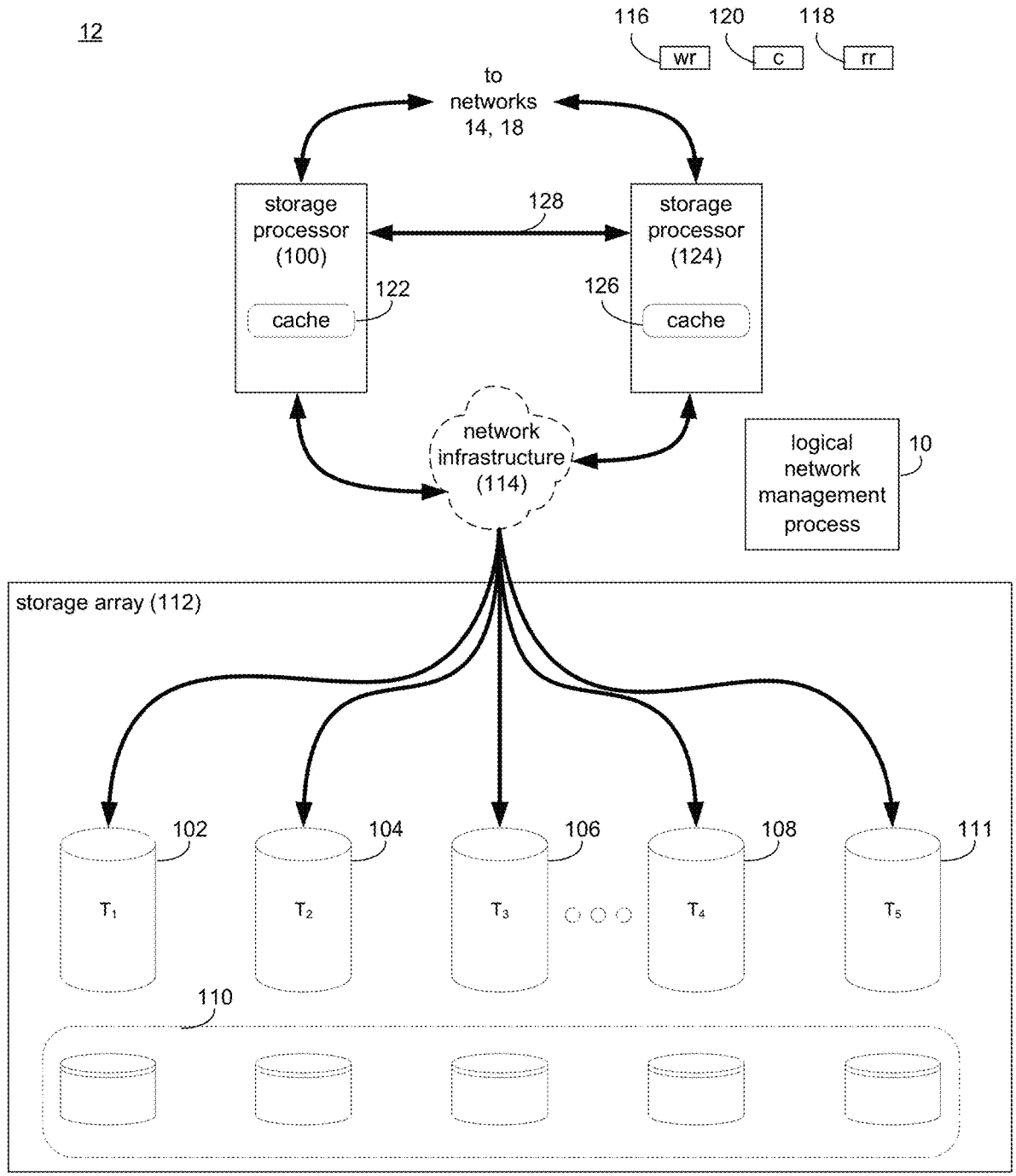
FIG. 2 is an example diagrammatic view of the storage system of FIG. 1 according to one or more example implementations of the disclosure.
Figure 3:
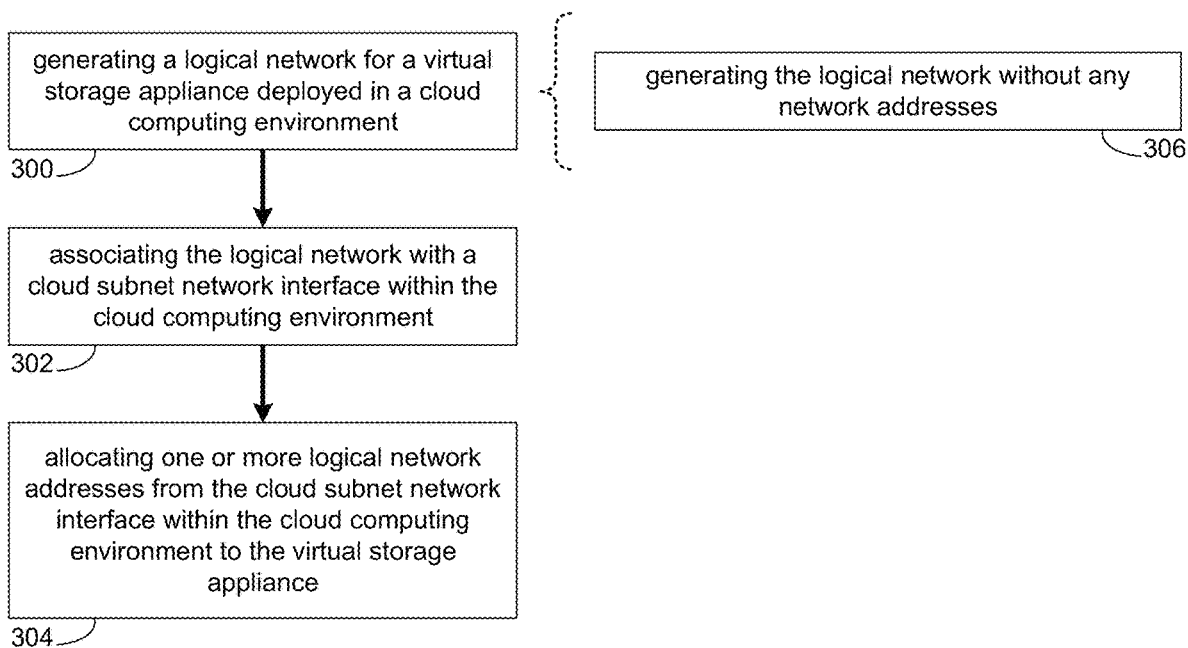
FIG. 3 is an example flowchart of logical network management process according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/ capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of logical network management process 10. The instruction sets and subroutines of logical network management process which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of logical network management process 10 may be stored on storage devices (and/or executed by processors and memory architectures) that are external to storage system 12.

As discussed above, various 10 requests (e.g. IO request 20) may be generated. For example, these IO requests may be sent from client applications 22, 24, 26, 28 to storage system 12. Additionally/alternatively and when storage processor 100 is configured as an application server, these 10 requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of logical network management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of logical network management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from being overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/ alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system). Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of logical network management process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of logical network management process 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Logical Network Management Process

Referring also to the examples of FIGS. 3-9 and in some implementations, logical network management process 10 may generate 300 a logical network for a virtual storage appliance deployed in a cloud computing environment. The logical network may be associated 302 with a cloud subnet network interface within the cloud computing environment. One or more logical network addresses may be allocated 304 from the cloud subnet network interface within the cloud computing environment to the virtual storage appliance.

As will be discussed in greater detail below, implementations of the present disclosure may provide a way of logical network organization for a VSA in the cloud. In some implementations, logical network management process 10 is based on having certain logical networks with automatically obtained networking characteristics matching the real underlying cloud networking environment, without the need to explicitly (manually) manage network addresses (e.g., IP addresses) by the user.

In some implementations and as discussed above, portions of a storage system (e.g., storage system 12) may be deployed in a cloud computing environment. A cloud computing environment is a technological environment that provides cloud-based computing services over a set of hosted servers and applications, which are accessible over the internet or other network configuration. Examples of cloud-based computing services include applications and development platforms, to servers, storage, and virtual computing systems. Cloud-based computing services are provided by cloud computing providers (cloud providers) as a service over the internet. Their services include servers, virtual machines, applications, application development platforms, storage, databases, and/or networking. Users (individuals or entities) can subscribe to cloud computing services with varying pricing options to choose from. Examples of cloud providers include, but are not limited to, Microsoft® Azure® from Microsoft Corporation in the United States, Amazon Web Services™ (AWS™) from Amazon.com, Inc., and Google Cloud Platform™ from Google LLC.

Figure 4:
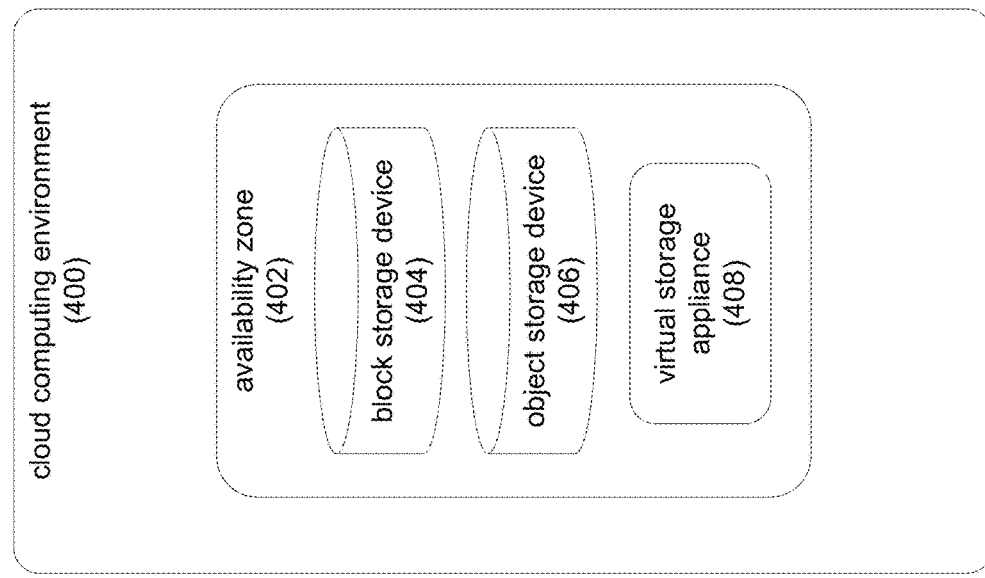
FIG. 4 is an example diagrammatic view of a cloud computing environment according to one or more example implementations of the disclosure.

Referring also to FIG. 4 and in some implementations, a cloud computing environment (e.g., cloud computing environment 400) may be configured to perform various cloud-based computing services. In some implementations, the cloud computing environment may include availability zones (e.g., availability zone 402). An availability zone is an isolated data center or storage system located within specific regions in which public cloud services originate and operate. Cloud service providers typically have multiple worldwide availability zones. This helps ensure cloud customers have a stable connection to a cloud service in the geographic zone that is closest to them and/or that meets their specific needs. Users typically use availability zones for a variety of reasons, including compliance and proximity to customers. Cloud administrators can also choose to replicate services across multiple availability zones to decrease latency or protect resources. Administrators can move resources to another availability zone in the event of an outage. Specific cloud services may also be limited to particular regions or availability zones.

In some implementations, each availability zone (e.g., availability zone 402) may have access to or include various resources. For example, each availability zone (e.g., availability zone 402) may provide access to various storage resources (e.g., block storage device 404; object storage device 406; and virtual storage appliance (VSA) 408). In some implementations, a block storage device (e.g., block storage device 404) is a storage device deployed within the cloud computing environment that is configured to store data in equally sized blocks. This system offers performance advantages over traditional storage, and generally boasts lower latency. However, a block storage device is a premier storage device and is typically the most expensive. In one example, the cloud-based block storage device is Amazon Elastic Block Storage.

In some implementations, cloud-based object storage is a storage service in public cloud resources that is cost efficient. Cloud-based object storage is well suited for static data and its agility and flat nature means it can scale to extremely large quantities of data. In some implementations, the cloud-based objects have sufficient information for an application to find the data quickly. Cloud-based object storage also supports HTTP protocol for data transfer and most clients support HTTP. In one example, availability zone 402 may provide access to one or more cloud-based object storage devices (e.g., object storage device 406). In one example, object storage device 406 is an Amazon S3 storage device.

Cloud computing environments use virtualization technology, which allows for the creation of simulated virtual computers that behave like physical computers. Such computers are called Virtual Machines (VM). Though multiple VMs can be created on one physical server, VMs typically work as isolated independent machines and their files and other resources are not visible to one other. Virtualization allows more efficient use of hardware resources by running multiple VMs in the same hardware and serving multiple users or user applications at the same time, which helps to reduce the cost of computing.

In some implementations, a virtual storage appliance (VSA) may be deployed in the cloud computing environment. A VSA is a set of virtual machines in the cloud computing environment with storage devices that typically store an operating system, applications, and data. In the example of FIG. 4, a VSA (e.g., VSA 408) may be deployed within availability zone 402. In one example, VSA 408 is a PowerStore™ virtual storage appliance available from Dell Technologies Inc. However, it will be appreciated that various VSAs may be used within the scope of the present disclosure.

With enterprise storage systems, one of the ways to organize external and internal networking in an on-premises storage system is to have a set of logical networks (e.g., a management network, one or more storage networks, and/or one or more networks for internal use within the storage system). Network settings are usually managed manually by an administrator, who explicitly specifies necessary network addresses (e.g., IP addresses), their purposes (what they are used for in the system), VLANs, gateways, maximum transmission units (MTUs), etc. However, cloud networking (e.g., networking of VSAs within a cloud computing environment) has significant distinctions from the configuration of an on-premises storage system. For example, cloud networking does not include Layer 2 networking. Additionally, cloud networking has a single subnet per network interface/port. In some implementations, there are limits on the number of network interfaces per VSA instance deployed and there are typically limited numbers of network addresses per network interface. Additionally, moving a network address from one network interface to another may require orchestration within the cloud computing environment. Further, cloud computing environments may include automatic dynamic network address management (IP Address Management (IPAM)). Accordingly, it will be appreciated that various distinctions exist between on-premises logical network deployment versus cloud computing environment logical network deployment which reduce the effectiveness of VSA deployment in a cloud computing environment.

For example, when moving to the cloud-native deployment of VSAs, the goal is to adjust a common on-premises storage system networking architecture to the cloud world, make it cloud-native and easy-to-use. The cloud computing environment is much more dynamic compared to the on-premises and has significant distinctions, as described above. As will be discussed in greater detail below, logical network management process may provide VSA deployment with the following characteristics to address the distinctions between on-premises networking and cloud networking: 1) keeping the logical networking model of on-premises storage systems; 2) supporting highly available "floating" network addresses; 3) being able to start up based on the networking information automatically obtained from the cloud computing environment during initial deployment; and 4) staying within certain limits of the cloud computing environment.

In some implementations, logical network management process 10 may generate 300 a logical network for a virtual storage appliance deployed in a cloud computing environment. A logical network is a virtual representation of a network within the VSA that appears (to a user) as an entirely separate and self-contained network even though it might physically be only a portion of a larger network or a local area network. A logical network may also be an entity that has been created out of multiple separate networks and made to appear as a single network. This is often used in virtual environments where there are physical and virtual networks running together; so, out of convenience and function, separate networks can be made into a single logical network. In some implementations, the logical network includes a network gateway, a maximum transmission unit (MTU), and a network type. For example, each of the logical networks has certain settings similarly to an on-premises network including, but not limited to: a set of network addresses (e.g., IP addresses) to be used by applications (including one or more highly available floating IP addresses as will be discussed in greater detail below); a network gateway; a maximum transmission unit (MTU), a network type, and other application-specific characteristics configured to customize the way a particular logical network is managed internally and specify what it is used for.

Figure 5:
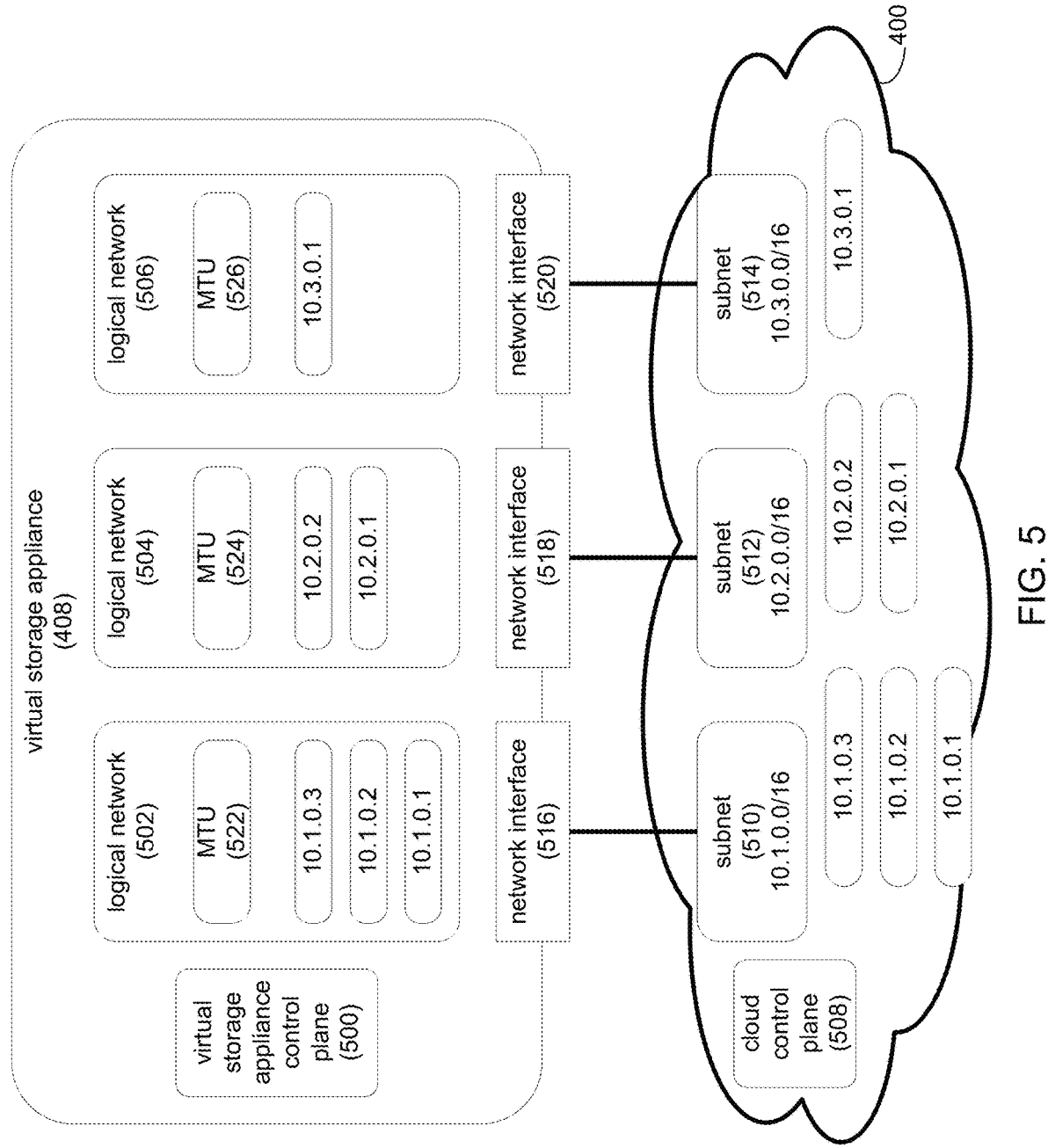
FIG. 5 is an example diagrammatic view of the logical network management process according to various example implementations of the disclosure.

Referring also to FIG. 5, a virtual storage appliance (VSA) (e.g., VSA 408) may include a VSA control plane (e.g., VSA control plane 500). A VSA control plane is a software component configured to manage networking (e.g., routing and switching functions) within the VSA. In some implementations, logical network management process 10 may generate 300 a logical network (e.g., logical networks 502, 504, 506) using a VSA control plane (e.g., VSA control plane 500) and a cloud control plane (e.g., cloud control plane 508). A cloud control plane (e.g., cloud control plane 508) is a software component that provides management and orchestration of functionality across a cloud computing environment. In some implementations, cloud control plane 508 may manage networking functionality within the cloud computing environment. For example, suppose cloud computing environment 400 includes a plurality of cloud subnets (e.g., subnets 510, 512, 514). Cloud control plane 508 may manage each subnet (e.g., subnets 510, 512, 514). As shown in FIG. 5, subnet 510 may include a range of logical network addresses (e.g., network address range: 10.1.0.0/16) with e.g., three logical network addresses (e.g., network addresses: 10.1.0.3; 10.1.0.2; and 10.1.0.1). Subnet 512 may include a separate range of logical network addresses (e.g., network address range: 10.2.0.0/16) with e.g., two logical network addresses (e.g., network addresses: 10.2.0.2; and 10.2.0.1); and subnet 514 may include yet another range of logical network addresses (e.g., network address range: with e.g., one logical network address (e.g., network address: 10.3.0.1). As will be discussed in greater detail below, cloud control plane 508 may manage the networking within cloud computing environment 400 using subnets 510, 512, 514.

In some implementations, VSA 408 may include a plurality of network interfaces (e.g., network interfaces 516, 518, 520) configured to couple a logical network (e.g., logical networks 502, 504, 506) of VSA 408 to a subnet (e.g., subnets 510, 512, 514) of cloud computing environment 400. As shown in FIG. 5, each logical network may include a maximum transmission unit (MTU) (e.g., MTUs 522, 524, 526). In some implementations, the MTU may be a user-defined value provided when generating 300 the logical network (e.g., logical networks 502, 504, 506). Logical network management process 10 may generate 300 the logical network (e.g., logical networks 502, 504, 506) with a network type. For example, the network type may include various settings that define the networking protocol (e.g., iSCSI, NVMe, TCP, etc.) of the logical network. In some implementations, the network address and network gateway can be automatically obtained from the cloud control plane.

Figure 6:
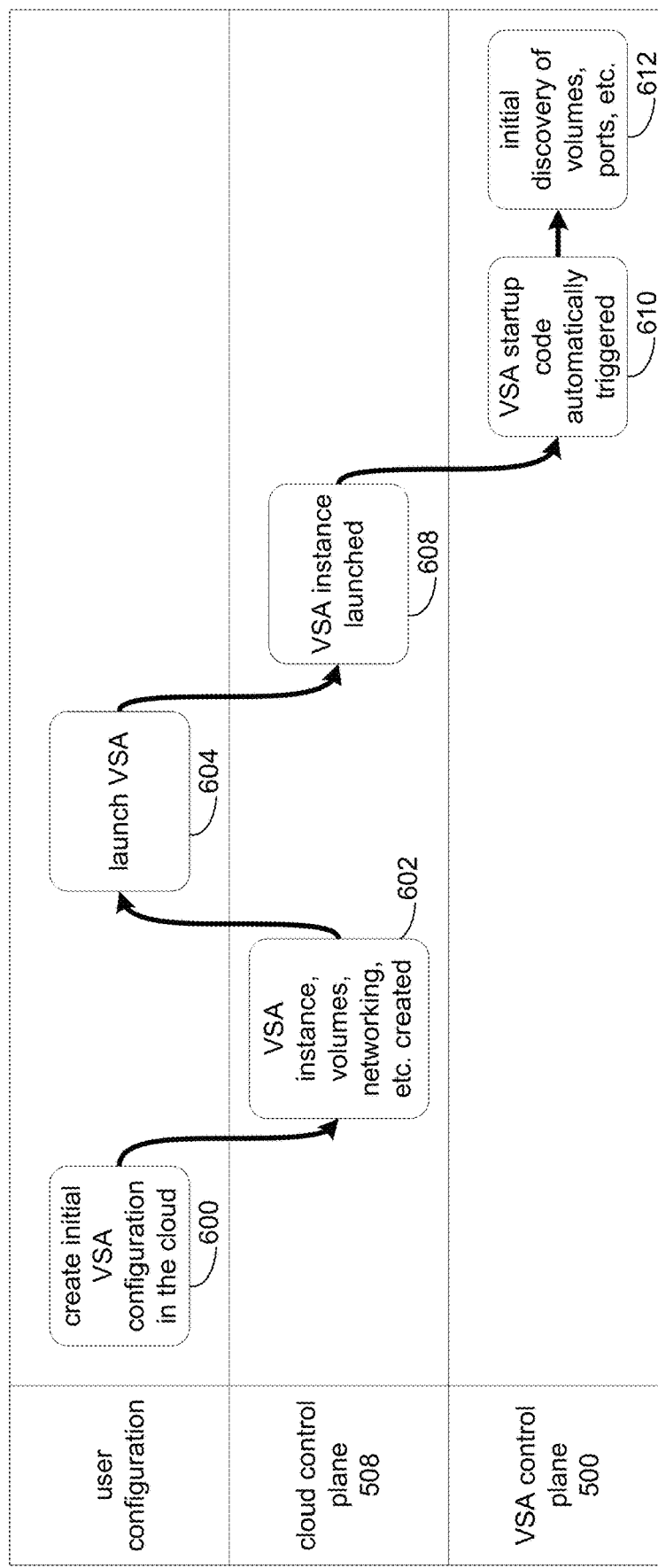
FIGS. 6-7 are example workflows of the logical network management process according to various example implementations of the disclosure.

Referring also to FIG. 6, the sequence of operations performed by user configurations, the VSA control plane (e.g., VSA control plane 500), and the cloud control plane (e.g., cloud control plane 508) to generate the logical network, is shown. For example, the initial deployment of a storage system is done via IaC (infrastructure as code), for example, via Cloud Formation Templates (AWS term), or even via a simple automation script using the cloud SDK. This is shown in FIG. 6 as action 600 labeled "create initial VSA configuration in the cloud". The cloud control plane (e.g., cloud control plane 508) creates the VSA instance (e.g., VSA 408), volumes, networks, etc. as shown in action 602. The VSA is launched with actions 604 and 606, which triggers the VSA startup code as shown in action 608 and initial discovery of volumes and ports for the VSA as shown in action 610.

Figure 7:
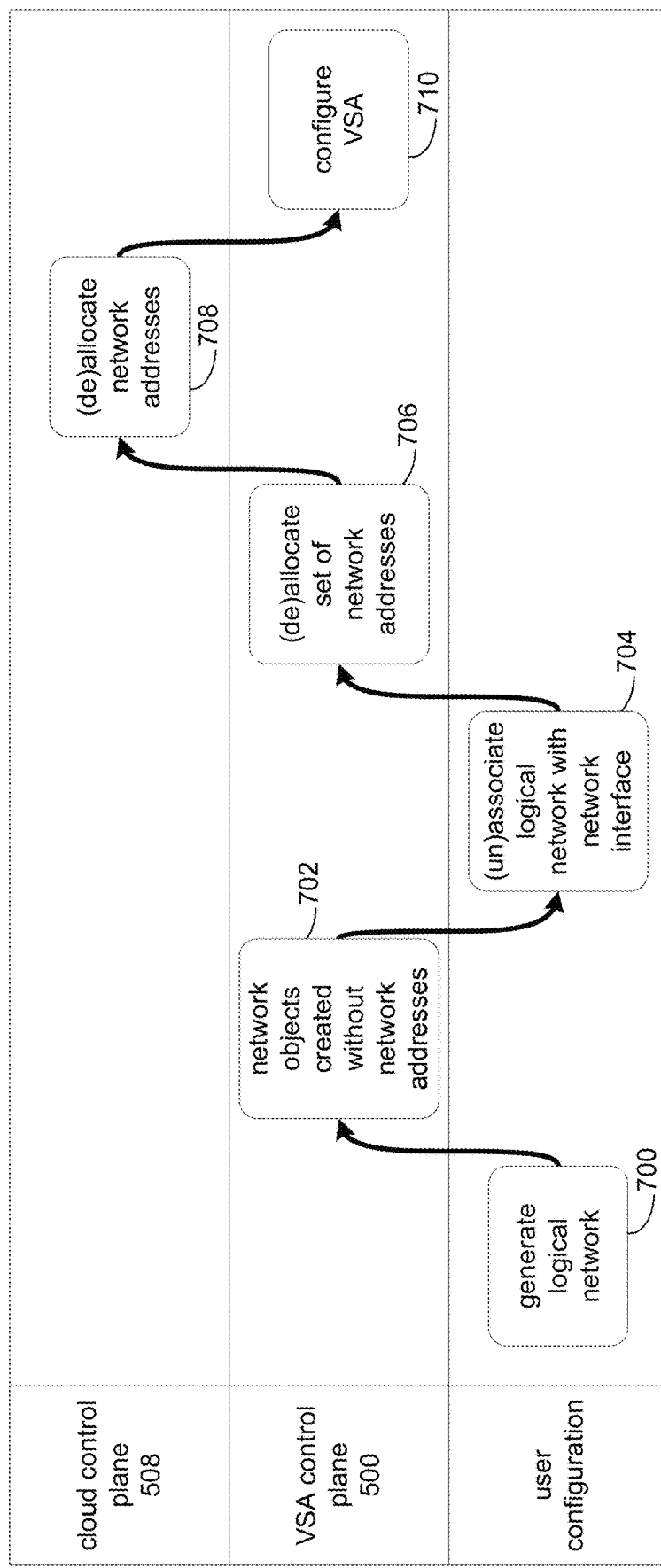

In some implementations, generating 300 the logical network for the virtual storage appliance may include generating 306 the logical network without any network addresses. Referring also to FIG. 7 and in some implementations, a user may initiate the process (e.g., logical network management process 10) for generating 300 a logical network (e.g., action 700). VSA control plane 508 may generate 300 the logical network (e.g., logical networks 502, 504, 506) without any network addresses as shown in action 702.

In some implementations, logical network management process 10 may associate 302 the logical network with a cloud subnet network interface within the cloud computing environment. For example and as shown in FIG. 7, action 704 includes associating a logical network (e.g., logical networks 502, 504, 506) with a network interface (e.g., network interfaces 516, 518, 520). Associating 302 a logical network with a network interface may generally include discovering the corresponding network interfaces (e.g., network interfaces 516, 518, 520) as local ports of the VSA and initializing a networking stack or protocol. Referring again to FIG. 5, logical network management process 10 may generate 300 a logical network (e.g., logical networks 502, 504, 506) on top of network interfaces (e.g., network interfaces 516, 518, 520) and their cloud subnets (e.g., subnets 510, 512, 514). In some implementations, each of the network interfaces (e.g., network interfaces 516, 518, 520) has a subnet bound to it in the cloud control plane. Network interfaces (e.g., network interfaces 516, 518, 520) may share the same subnet or have completely different subnets. As will be discussed in greater detail below, the logical network addresses can be automatically allocated from the cloud subnet behind the corresponding network interface.

In some implementations, logical network management process 10 may allocate 304 one or more logical network addresses from the cloud subnet network interface within the cloud computing environment to the virtual storage appliance. Allocating 304 one or more network addresses includes designating one or more network addresses from the plurality of network addresses from the cloud subnet network interface for networking within the cloud computing environment. For example, upon the initial deployment, several network interfaces (e.g., network interfaces 516, 518, 520) are created and bound to cloud subnets (e.g., subnets 510, 512, 514). Specifically, network interface 516 is bound to subnet 510; network interface 518 is bound to subnet 512; and network interface 520 is bound to subnet 514. Accordingly, when a VSA instance is launched, the VSA control plane can discover the corresponding network interfaces as its local ports and initialize the networking stack. In some implementations, once a network interface is bound to a cloud subnet, logical network management process 10 obtains and allocates one or more network addresses randomly selected from the subnet.

Referring again to FIG. 7, at action 706, logical network management process may request allocation a set of network addresses in the VSA control plane and allocate the network addresses from the cloud subnet network interface (e.g., action 708). With the logical network address allocated 304 from the cloud subnet network interface, logical network management process 10 may configure the VSA network stack to network within cloud computing environment using the allocated network address(es) (e.g., action 710).

In some implementations, during storage system (e.g., VSA 408) runtime, if another network address is requested to be set up onto a network interface, logical network management process 10 may provide an additional call to the cloud control plane (e.g., cloud control plane 508) to allocate additional network addresses and bind them to the underlying cloud network interface. The process of a logical network being un-configured from a network interface is similar (as shown in FIG. 7).

In an on-premises storage system, network re-configuration usually means customer/administrator requests changes of one or more of the following parameters: 1) one or more IP addresses (i.e., replacing the IP 10.5.0.5 with another IP 10.6.0.6); 2) a network gateway; 3) an IP version (e.g., replace all current IPv4 addresses with new IPv6 addresses or vice versa by explicitly specifying all the IPs and gateway); 4) a virtual local area network (VLAN); 5) an MTU; and/or 6) application-specific settings. In the cloud, the approach used by logical network management process 10 is a zero-touch network configuration. With zero-touch network configuration, the corresponding aspects of network reconfiguration are different/not applicable as follows: 1) changing specific IP addresses within a network is not practical as the network addresses are automatically obtained from the cloud; 2) the gateway can be automatically calculated from the cloud subnet bound to the network interface, so it cannot be changed; 3) a network address version change can be done automatically. The only prerequisite is to ensure that the corresponding network address ranges (e.g., IP version CIDR ranges) are available behind the network interfaces the logical network is associated with; 4) VLAN is not applicable in the cloud computing environment; 5) MTU can be reconfigured similarly to an on-premises network; and 6) application-specific settings can be reconfigured similarly to an on-premises network.

Figure 8:
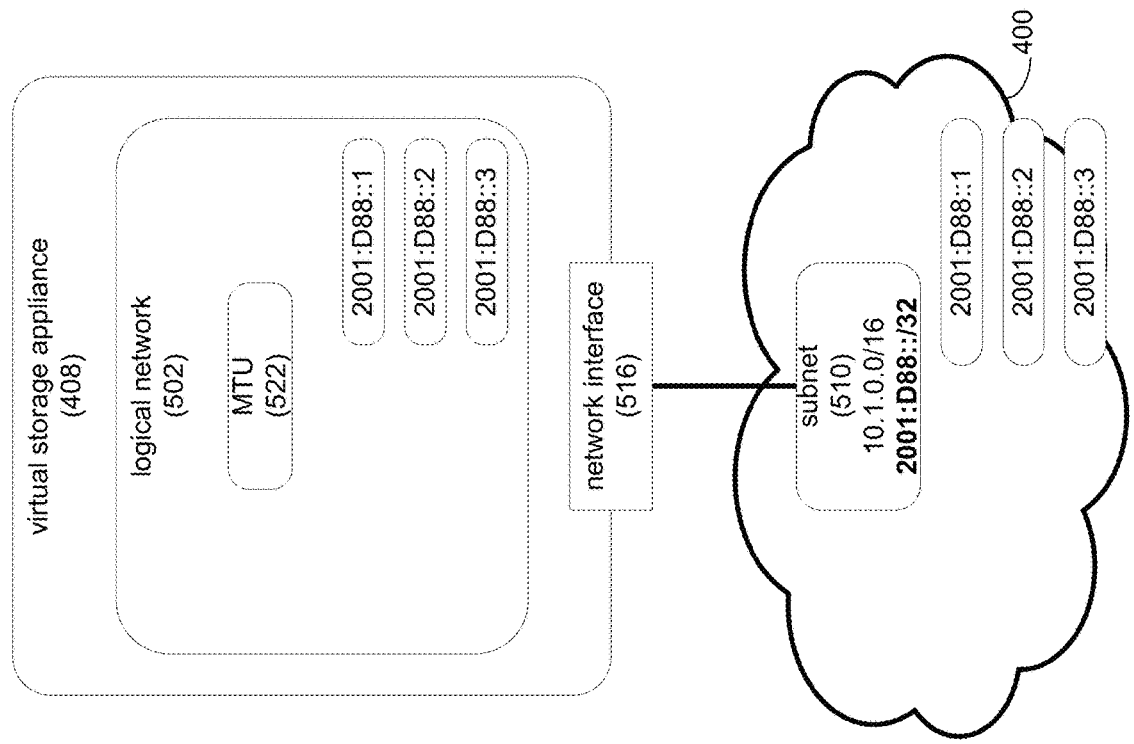
FIG. 8 is an example diagrammatic view of reconfiguration of a logical network according to various example implementations of the disclosure.
Figure 8:
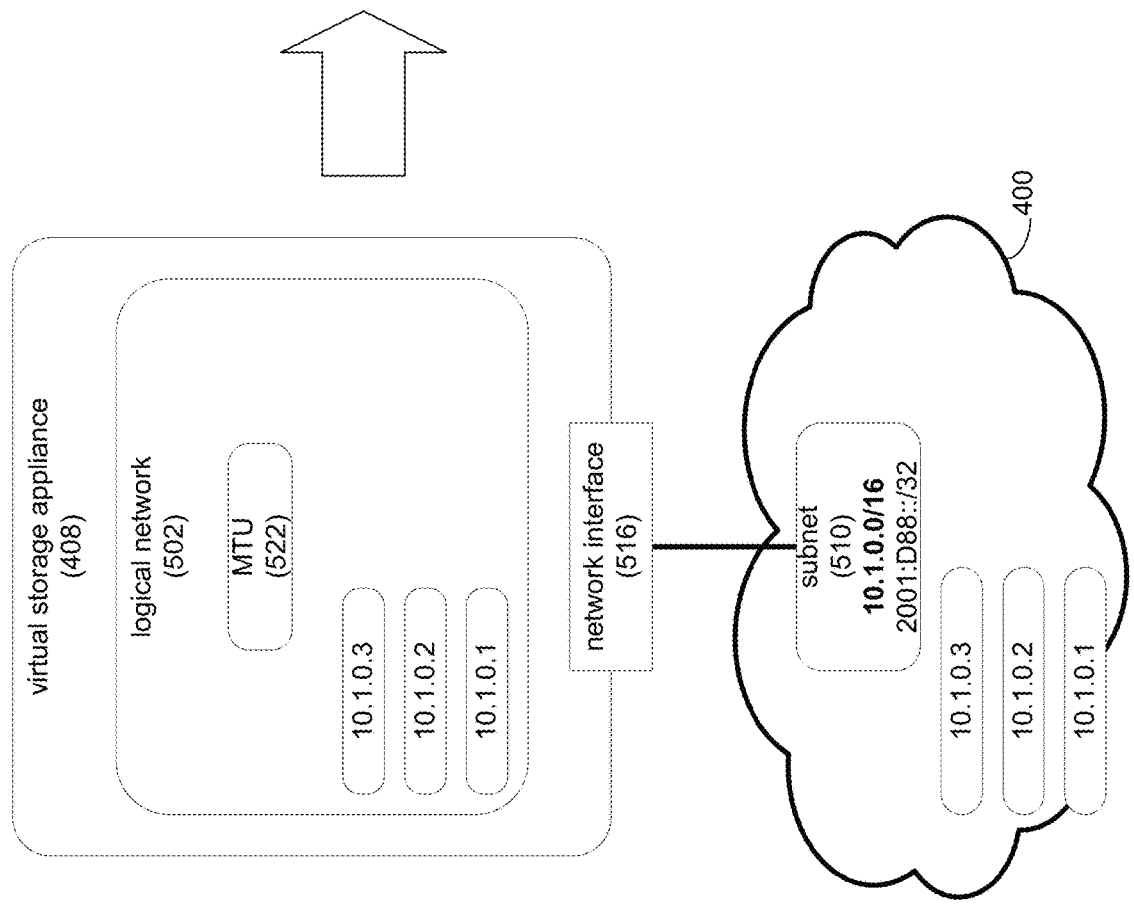

Referring also to FIG. 8, a network address version change is shown that requires a new network address range to be allocated in the corresponding subnet in the cloud. Then, upon reconfiguration, the network addresses allocated before (i.e., 10.1.0.0/16), are replaced with the same number of network addresses of a different version (e.g., 2001:D88::/32). In this example, the latter network addresses are provisioned in the cloud, and the former are released.

The one or more logical network addresses may include one or more floating network addresses. A floating network address is a network address that can be moved from one network interface to another (e.g., in case of fail-over). In an on-premises storage system, the floating network address is expressly defined and persisted. The floating network address can be moved from one port to another freely. However, movement of a network address between network interfaces in the cloud must be properly orchestrated via cloud control plane. In some implementations, the floating network address may be implemented in various ways. In one example, the floating network address is implemented as a floating network interface. In this example, a network interface can be detached from a VSA instance and moved to another instance as needed (e.g., during fail-over). Thus, the network interface has multiple floating network addresses on top of it, which are moved along with it.

In another example, logical network management process 10 defines a floating network address as networking address that, once moved, is deallocated from a source network interface and then allocated on a destination network interface via the cloud control plane. In this example, both source and destination network interfaces should have the same subnet bound to them. Once the cloud orchestration is complete, the network address can become reachable.

In another example, logical network management process 10 defines an ephemeral network address. An ephemeral network address is a network address outside of a cloud subnet's ranges and, as such, is unreachable. The ephemeral network address becomes reachable due to specific orchestration of cloud routing rules. This approach is beneficial to organize network address failover between network interfaces and corresponding instances located in different subnets and in different availability zones within the cloud, but requires additional orchestration of the cloud routing rules via the cloud control plane and necessary permissions to do that.

In some implementations, the one or more floating network addresses are automatically defined by dynamic network address management in the cloud computing environment. For example, logical network management process 10 may use dynamic network address management (IPAM) in the cloud to define and manage the floating network address. With dynamic network address management (IPAM), a user may not specify the floating network address explicitly, but may enable or disable it, and rely on a network address auto-selection mechanism in the cloud. If a floating network address is enabled for a subnet, an additional request to the cloud control plane is made to allocate a network address on top of a particular network interface.

Figure 9:
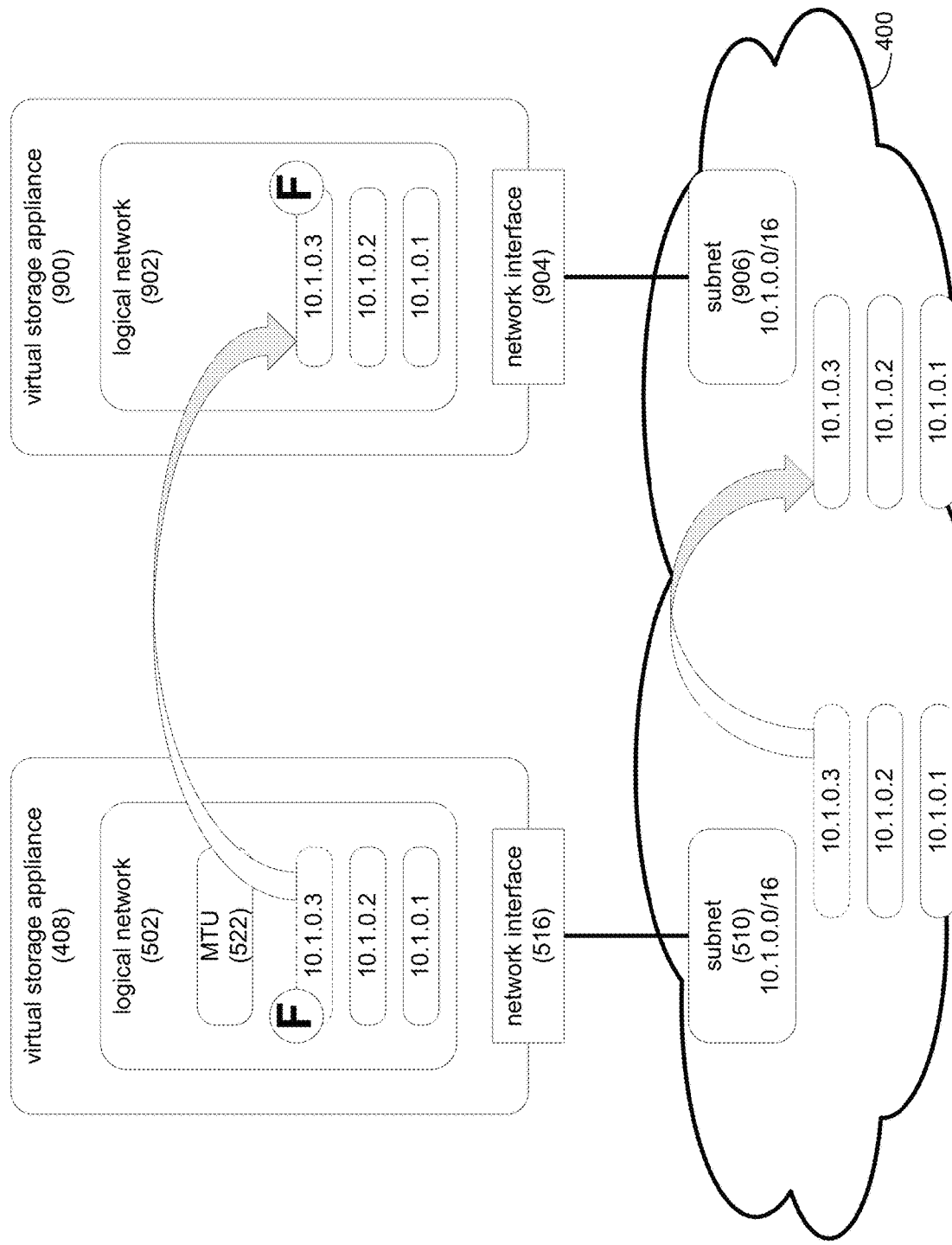
FIG. 9 is an example diagrammatic view of a floating network address of a logical network according to various example implementations of the disclosure.

Referring also to FIG. 9, the network address 10.1.0.3 is a floating network address that was residing on VSA 408 port 1, and due to some issues, is moved to another VSA (e.g., VSA 900) port 2. In this example, VSA 900 may include logical network 902 with network interface 904 bound to cloud subnet 906. In some implementations, in addition to setting/unsetting the network address inside the VSA instances, the network address is also allocated/deallocated in the cloud.

In some implementations, a cloud network interface may have a requirement to have primary network address that cannot be changed and or reassigned to another cloud network interface. As such, a floating network address may be selected from secondary network addresses bound to the network interface; otherwise, the network address may not be able to fail-over.

In some implementations, assuming the cloud computing environment includes dynamic IPAM, a recovery case may be addressed. For example, if an instance in the cloud is terminated, and only snapshots of the volumes are backed up, logical network management process 10 may create a new instance based on the snapshots. The new instance may get new cloud resources such as volumes, network interfaces, etc. which are the same as the previous ones, but with different IDs, network addresses and other characteristics that are automatically generated in the cloud. Once the recovered instance is brought up, the persistence that was stored on the volumes and is now recovered is considered stale and the management stack rediscovers underlying resources and properly handle any changes. From a networking point of view, the recovered instance has the same amount of network interfaces, but with different IDs, MAC addresses, and possibly different network addresses, which are automatically assigned in the cloud. The VSA control plane may fully resynchronize the persistence layer with the latest up-to-date networking information from the cloud and set up the new networking accordingly.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/ the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks. These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   generating a logical network for a virtual storage appliance deployed in a cloud computing environment, wherein the virtual storage appliance includes a set of virtual machines deployed in the cloud computing environment with a plurality of storage devices, an operating system, and an application stored therein, wherein generating the logical network for the virtual storage appliance includes generating a plurality of logical networks for the virtual storage appliance;
   associating the logical network with a cloud subnet network interface within the cloud computing environment, wherein associating the logical network with the cloud subnet network interface includes associating each logical network of the plurality of logical networks with a separate cloud subnet network interface within the cloud computing environment; and
   allocating one or more logical network addresses from the cloud subnet network interface within the cloud computing environment to the virtual storage appliance.

2. The computer-implemented method of claim 1, wherein the logical network includes a network gateway, a maximum transmission unit (MTU), and a network type.

3. The computer-implemented method of claim 2, wherein the network gateway is automatically obtained from the cloud computing environment.

4. The computer-implemented method of claim 2, wherein the MTU and the network type are user-defined.

5. The computer-implemented method of claim 1, wherein generating the logical network for the virtual storage appliance includes initially generating the logical network without any network addresses before allocating the one or more logical network addresses from the cloud subnet network interface within the cloud computing environment to the virtual storage appliance.

6. The computer-implemented method of claim 1, wherein the one or more logical network addresses include one or more floating network addresses.

7. The computer-implemented method of claim 6, wherein the one or more floating network addresses are automatically defined by dynamic network address management in the cloud computing environment.

8. A computer program product residing on a non-transitory computer readable medium having a plurality of instructions stored thereon which, when executed by a processor, cause the processor to perform operations comprising:
   generating a logical network for a virtual storage appliance deployed in a cloud computing environment, wherein the virtual storage appliance includes a set of virtual machines deployed in the cloud computing environment with a plurality of storage devices, an operating system, and an application stored therein, wherein generating the logical network for the virtual storage appliance includes generating a plurality of logical networks for the virtual storage appliance;
   associating the logical network with a cloud subnet network interface within the cloud computing environment, wherein associating the logical network with the cloud subnet network interface includes associating each logical network of the plurality of logical networks with a separate cloud subnet network interface within the cloud computing environment; and
   allocating one or more logical network addresses from the cloud subnet network interface within the cloud computing environment to the virtual storage appliance.

9. The computer program product of claim 8, wherein the logical network includes a network gateway, a maximum transmission unit (MTU), and a network type.

10. The computer program product of claim 9, wherein the network gateway is automatically obtained from the cloud computing environment.

11. The computer program product of claim 9, wherein the MTU and the network type are user-defined.

12. The computer program product of claim 8, wherein generating the logical network for the virtual storage appliance includes initially generating the logical network without any network addresses before allocating the one or more logical network addresses from the cloud subnet network interface within the cloud computing environment to the virtual storage appliance.

13. The computer program product of claim 9, wherein the one or more logical network addresses include one or more floating network addresses.

14. The computer program product of claim 13, wherein the one or more floating network addresses are automatically defined by dynamic network address management in the cloud computing environment.

15. A computing system comprising:
   a memory; and
   a processor configured to generate a logical network for a virtual storage appliance deployed in a cloud computing environment, wherein the virtual storage appliance includes a set of virtual machines deployed in the cloud computing environment with a plurality of storage devices, an operating system, and an application stored therein, wherein generating the logical network for the virtual storage appliance includes generating a plurality of logical networks for the virtual storage appliance, wherein the processor is further configured to associate the logical network with a cloud subnet network interface within the cloud computing environment, wherein associating the logical network with the cloud subnet network interface includes associating each logical network of the plurality of logical networks with a separate cloud subnet network interface within the cloud computing environment, and wherein the processor is further configured to allocate one or more logical network addresses from the cloud subnet network interface within the cloud computing environment to the virtual storage appliance.

16. The computing system of claim 15, wherein the logical network includes a network gateway, a maximum transmission unit (MTU), and a network type.

17. The computing system of claim 16, wherein the network gateway is automatically obtained from the cloud computing environment.

18. The computing system of claim 16, wherein the MTU and the network type are user-defined.

19. The computing system of claim 15, wherein generating the logical network for the virtual storage appliance includes initially generating the logical network without any network addresses before allocating the one or more logical network addresses from the cloud subnet network interface within the cloud computing environment to the virtual storage appliance.

20. The computing system of claim 15, wherein the one or more logical network addresses include one or more floating network addresses.

* * * * *